United States Patent Office 3,243,685
Patented Mar. 29, 1966

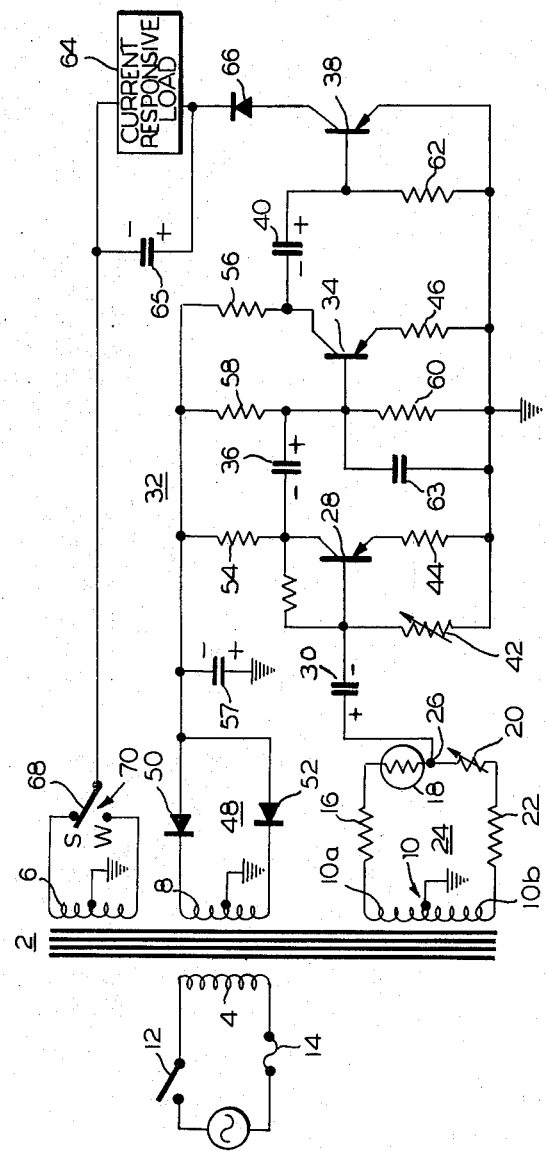
INVENTOR
BILLY BURLEY

3,243,685
CONDITION RESPONSIVE ELECTRONIC
SYSTEM
Billy Burley, Dallas, Tex., assignor, by mesne assignments, to Johnson Service Company, Milwaukee, Wis., a corporation of Wisconsin
Filed June 29, 1962, Ser. No. 206,348
8 Claims. (Cl. 321—16)

This invention relates to an electronic system affording modulating control in response to deviations in a condition in a given sense from a predetermined value.

In condition-responsive systems, it is often desirable to provide an electronic control affording modulating control over a device in accordance with the degree of deviation of a condition from a predetermined value. In some control systems—for example, control systems such as those disclosed in my companion applications Serial No. 206,347 filed June 29, 1962 and entitled, "Electronic Control Responsive to Opposite Senses of Condition Deviation," and Serial No. 206,349 filed June 29, 1962, and entitled, "Electronic System Responsive to Opposite Senses of Condition Deviation," modulating response is obtained for deviations in a condition in opposite senses from a predetermined value. The present invention relates to an electronic control affording a modulating response only for deviations in a measured condition (such as temperature, pressure, humidity or the like) in one sense from a predetermined value, said control being deactivated for deviations of said condition in the opposite sense from said predetermined value.

The electronic control of the present invention is particularly suitable for use in a heating and/or air conditioning system wherein a regulator (such as a valve, damper or the like) controlling the flow of a temperature-modifying medium is adjusted in modulating response to deviation of measured temperature in one sense from a predetermined value, said control being deactivated when the condition deviates in the opposite sense.

Thus an object of the present invention is to provide a condition-responsive electronic control that is activated only when a measured condition deviates in one sense from a predetermined value and that affords modulating response as a function of the magnitude of the condition deviation.

Another object of the present invention is to provide means for regulating the flow of current through a current-responsive load as a function of the degree of deviation of a condition in one sense from a predetermined value and de-energizing the load when the condition deviates in the opposite sense from the predetermined value.

A further object of the invention is to provide means supplying alternate half-cycles of an A.-C. reference voltage to a current-responsive load, and condition-responsive means operable—for condition deviations in one sense from a predetermined value—to control the level of effective D.-C. current sensed by the load as a function of the magnitude of the condition deviation, and operable—for condition deviations in the opposite sense—to de-energize the load.

A more specific object of the invention is to provide an electronic control system including a transistor, a source of an A.-C. reference voltage, half-wave rectifier means supplying alternate half-cycles of said reference voltage, a current-responsive load, load circuit means connecting said rectifier means and said load in series with the emitter to collector circuit of said transistor, and condition-responsive means applying to said base electrode an A.-C. signal voltage having one of two opposite phase relationships relative to said reference voltage in accordance with the sense of deviation of a condition from a predetermined value and a magnitude that is a function of a degree of condition deviation. In one embodiment of the invention the condition-responsive means comprises a condition-responsive balanced-bridge network of the variable resistance, inductance, capacitance or impedance type. The bridge network includes an energizing winding that is inductively coupled with the source of reference voltage. In accordance with the teachings presented in my companion application Serial No. 206,343 filed June 29, 1962, and entitled, "Electronic System Affording Reversible Modulating Control," the phase relationship between the signal and reference voltages may be reversed to reverse the sense of response of the electronic control to deviations in the measured condition from a predetermined value.

Other objects and advantages of the invention will become apparent from a study of the following specification when considered in conjuncation with the accompanying single figure of drawing which comprises an electrical schematic diagram of one embodiment of the electronic control of the present invention.

Referring to the drawing, transformer 2 is provided with a primary winding 4, and three secondary windings 6, 8 and 10 each having grounded center taps. Power is supplied to primary winding 4 via a supply circuit including an alternating current source, switch 12 and fuse 14. Secondary winding 10 is connected in series with fixed resistor 16, thermistor 18, variable resistance 20 and fixed resistor 22 to define temperature-responsive balanced bridge circuit 24. Bridge terminal 26 intermediate thermistor 18 and variable resistance 20 is connected with the base electrode of transistor 28 via condenser 30. Transistor 28, which forms the first stage of amplifier 32, includes a collector electrode connected with the base electrode of transistor 34 via condenser 36. The collector electrode of transistor 34 is connected with the base electrode of transistor 38 via condenser 40. Variable resistance 42 affords means for adjusting the potential of the base electrode of transistor 28, and grounding resistors 44 and 46 determine the potentials of the emitter electrodes of transistors 28 and 34, respectively, and serve to temperature-stabilize the amplifier stages. Full-wave rectifier circuit 48, that includes secondary winding 8 and diodes 50 and 52 connected in series opposition, applies biasing potentials to the collector electrodes of transistors 28 and 34 via collector resistors 54 and 56, respectively. Condenser 57 serves to smooth out the rectified biasing voltage. A voltage divider circuit including resistors 58 and 60 determines the base electrode potential of transistor 34, and resistor 62 determines the base potential of grounded-emitter transistor 38. Phase compensating condenser 63 connected in parallel with resistor 60 causes the amplified signal applied to the base electrode of transistor 38 to be in phase with the bridge unbalance signal produced at junction 26. Transistors 28, 34 and 38 have been illustrated as being of the p-n-p type, although it is apparent that by appropriate modification of the circuit, use could be made of transistors of the n-p-n type.

The collector electrode of transistor 38 is connected to one terminal of current-responsive load 64 via diode rectifier 66. The other load terminal is connected with the movable contact 68 of double-throw seasonal switch 70 the stationary contacts S and W of which are connected with opposite ends of secondary winding 6. Smoothing condenser 65 is connected in parallel with load 64. Load 64 may be the heating resistance of an expansible fluid actuator, the winding of a solenoid actuator, a relay winding, a current-responsive staging network, or the like.

*Operation*

(1) *Heating and air conditioning control—summer.—*
Assume that current-responsive load 64 is an electrically controlled modulating valve that is spring-biased to a fully open condition and is connected in a conduit supplying cooling water to a room the temperature of which is to be regulated. (Among other alternatives, the load could be an electrically controlled damper in a conduit supplying cool air to the room.) Assume further that movable contact 68 of seasonal switch 70 is in the illustrated summer position, that variable resistance 20 is adjusted to establish a balanced bridge condition when thermistor 18 senses a room temperature of 75° F., that the setting of variable resistance 42 establishes a temperature responsive range of 1 degree on either side of set temperature, that transistor 28 is biased to Class A operation, and that transistor 38 is biased to cut-off.

If room temperature should equal set temperature when power switch 12 is closed to energize secondary windings 6, 8 and 10, bridge 24 is balanced, transistor 38 is non-conductive, load 64 is de-energized, and the modulating valve is spring-biased to the fully open position to maintain maximum supply of cooling fluid through the conduit. Alternate negative half cycles of the reference voltage are applied to the collector of non-conductive transistor 38 via diode 66.

Assuming now that room temperature exceeds set temperature, bridge 24 becomes unbalanced and a signal voltage is developed at junction 26 that has a given instantaneous phase relationship and a magnitude that is a function of the deviation of temperature from set temperature. The signal voltage is amplified by amplifier 32 and is applied to the base electrode of transistor 38. With seasonal switch 70 in the summer position, the phase relationship between the signal voltage applied to the base of transistor 38 and the negative half cycles of reference voltage applied to the collector electrode of transistor 38 via diode 66 is such as to cause the transistor to be non-conductive, whereupon the electronic control remains de-activated, load 64 remains de-energized, and the modulating valve remains spring-biased to the fully open condition. It is apparent that with switch 70 in the summer position, the electronic control is de-activated for all values of room temperature equal to and above set temperature.

Assuming now that room temperature equals a value below set temperature (for example, 74°) bridge 24 becomes unbalanced in the opposite sense to produce a signal voltage having a magnitude that is proportional with the extent of the 1° deviation between set temperature and room temperature. The signal voltage applied to the base electrode of transistor 38 has such a phase relationship relative the negative half cycles of reference voltage applied to the collector electrode via diode 66 that transistor 38 becomes conductive, whereupon secondary winding 6 is connected with ground via load 64, diode 66 and the emitter to collector circuit of transistor 38. The level of the effective D.-C. current flowing in this load circuit is regulated by the effective impedance of transistor 38, which impedance is a function of the magnitude of the amplified signal voltage. Thus the current flowing through load 64 is a function of the 1° deviation in temperature from set temperature. Since the calibration of the system affords a 1° response range, the regulating valve controlled by load 64 is moved to a substantially closed throttling position to reduce the flow of cooling medium to the demand. This decrease in the flow of the cooling medium results in an increase in room temperature, whereby the temperature deviation sensed by the bridge is reduced, the signal voltage decreases, the impedance of transistor 38 increases, and the level of current flowing through load 64 decreases, whereupon the spring-biased valve moves toward the fully-open position. In accordance with the calibration of the system, this modulating action of the valve continues until a balanced condition between the heat transfer medium and space (room) temperature is reached, whereupon the valve has a throttling position meeting the space load requirements and maintaining the space at the desired temperature.

It is apparent that when the seasonal switch is in the summer position, modulation control over the valve is obtained only when room temperature is less than set temperature. The degree of closing of the modulating valve is a function of the magnitude of temperature.

(2) *Winter.*—Assume now that heated fluid is conducted through the conduit containing the modulating valve and that seasonal switch 70 is in the winter position.

When room temperature equals set temperature, bridge 24 is balanced, transistor 38 is non-conductive, load 64 is de-energized, and the modulating valve is spring-biased to its fully open condition.

If room temperature should be below set temperature, the phase relationship between the amplified signal voltage applied to the base electrode of transistor 38 and the half cycles of negative D.-C. voltage applied to the collector electrode is such as to cause transistor 38 to be non-conductive, the electronic control to be de-activated, load 64 to be de-energized, and the modulating valve to be fully open.

If room temperature should exceed set temperature, the signal voltage has a phase relationship relative to the reference voltage which causes conduction of transistor 38 during alternate half-cycles of the reference voltage. Since the magnitude of the signal voltage is a function of the extent of temperature deviation, modulation control of the valve is obtained as described above, the degree of closing of the valve being a function of the magnitude of temperature deviation. As room temperature progressively decreases, the signal voltage and effective D.-C. load current progressively decrease, and the modulating valve is progressively moved toward its fully-open position. After a period of time, the valve will have assumed a throttling medium and space (room) temperature in accordance with the load demands of the space.

Since the magnitude of the unbalanced bridge signal voltage is a function of the extent by which the measured condition deviates from a predetermined value, it is apparent that, by the use of a suitable load 64 (such as resistance-heated expansible-fluid or hydraulic actuators), proportional-response actuation of the mechanically controlled device—together with the selective phase reversing changeover operation described above—may be readily achieved.

While in accordance with the provisions of the patent statutes I have illustrated and described the preferred embodiment of the invention now known to me, it will be apparent to those skilled in the art that improvements and modifications may be made in the apparatus described without deviating from the invention set forth in the following claims.

What is claimed is:

1. An electronic system affording modulating control in response to deviations in a condition from a predetermined value, comprising a transistor having emitter, collector and base electrodes;
   half-wave rectifier means including a source of an alternating-current reference voltage for supplying alternate half-cycles of said reference voltage;
   a current-responsive load having an output means controlled by the level of current through the load;
   load circuit means connecting said rectifier means and said load in series with the emitter to collector circuit of said transistor;
   and condition-responsive means applying to said base electrode an alternating-current signal voltage having one of two opposite phase relationships relative to said reference voltage in accordance with the sense of deviation of a condition from a predetermined value and a magnitude that is a function of the degree of condition deviation.

2. Apparatus as defined in claim 1 wherein said condition-responsive means includes a condition-responsive bridge network including an input winding inductively coupled with said reference voltage and providing an alternating current bias signal to the base of the transistor whereby the transistor is cut off during one-half cycle and biased to conduct during the alternate half cycle, the degree of conduction being related to the amplitude of the bias signal whereby the degree of load energization is proportionately modulated.

3. An electronic system affording modulating control in response to deviations in a variable condition such as temperature, humidity and pressure from a predetermined value, comprising
   a current-responsive load having an output means proportionally driven in accordance with the current level through the load,
   a voltage source having a source of alternating current reference voltage and a half-wave rectifier means connected in series with each other and with said load to form a series load circuit,
   electrical means having an output circuit and an input circuit, said output circuit affording a variable impedance and being connected in series in said series load circuit, said input circuit continuously adjusting the value of the variable impedance for controlling the current supplied to the load, and
   a condition-responsive means including an alternating current signal network connected to said input circuit and an energizing winding for said network, said energizing winding being inductively coupled with the reference voltage source to produce a control signal of the same frequency as said reference voltage and being in phase with the reference voltage in response to variation in the condition in one direction and being 180 degrees out of phase with the reference voltage in response to variation in the condition in an opposite direction.

4. Apparatus as defined in claim 3 wherein said network is a bridge network.

5. An electronic system affording modulating control in response to deviations in a condition from a predetermined value, comprising
   a transformer having a plurality of winding means for generating phase-related alternating-current voltages;
   a current-responsive load;
   a uni-directionally conductive device;
   first current-contolling means including a pair of power circuit electrodes and a control electrode;
   load circuit means connecting in series with a first of said winding means, said load, said uni-directionally conductive device, and the power circuit electrodes of said first current-controlling means whereby the load is driven only during one-half cycle of the voltage of the corresponding winding means;
   condition-responsive alternating-current bridge network means having an input connected to a second of said winding means and generating at the output terminal means an output signal voltage the amplitude and phase of which are a function of the magnitude and sense of the deviation of a condition from a predetermined value; and
   means to connect the output terminal means to the control electrode of the current controlling means for proportionately varying the conductivity and impedance of the curent-controlling means and thereby modulating the energization of the load during a selected portion of each half-cycle of the load energizing current.

6. The system of claim 5 wherein said last named means includes
   amplifier means connected between the output terminal of said bridge network means and the control electrode of said first current-controlling means and comprising full-wave rectifier means connected to a third of the transformer winding means, and second current-controlling means including a pair of power circuit electrodes connected in series with said full-wave rectifier means, and a control electrode connected with the output terminal of said bridge network means, one of the power circuit electrodes of said second current-controlling means being connected also with the control electrode of said first current-controlling means.

7. Apparatus as defined in claim 6 wherein said first and second current-controlling means comprise a pair of transistors the base electrodes of which constitute said control electrodes.

8. Apparatus as defined in claim 6 wherein said amplifier means includes a plurality of said second current-controlling means connected to define additive signal amplifying stages.

References Cited by the Examiner

UNITED STATES PATENTS

| | | | |
|---|---|---|---|
| 2,585,005 | 2/1952 | Godshalk et al. | 323—75 |
| 2,907,932 | 10/1959 | Patchell | 317—148.5 |
| 3,107,324 | 10/1963 | Wright et al. | 323—68 X |
| 3,119,055 | 1/1964 | Martin | 323—9 |
| 3,153,187 | 10/1964 | Klees | 323—22 |
| 3,196,344 | 7/1965 | Walker | 323—22 |

LLOYD McCOLLUM, *Primary Examiner.*

MILTON O. HIRSHFIELD, *Examiner.*

D. L. RAE, H. B. KATZ, *Assistant Examiners.*